United States Patent [19]
Nishikawa

[11] Patent Number: 5,901,984
[45] Date of Patent: May 11, 1999

[54] COUPLING MECHANISM FOR CONNECTING A FLUID LINE TO A MASS FLOW CONTROLLER OR OTHER DEVICE

[75] Inventor: Masami Nishikawa, Miyanohigashi-machi, Japan

[73] Assignee: Stec Inc., Kyoto, Japan

[21] Appl. No.: 08/984,302

[22] Filed: Dec. 3, 1997

[30] Foreign Application Priority Data

Dec. 3, 1996 [JP] Japan .................................. 8-339034

[51] Int. Cl.⁶ .................................................. F16L 35/00
[52] U.S. Cl. .............................. 285/24; 285/93; 285/325; 285/198
[58] Field of Search .............................. 285/24, 27, 325, 285/326, 327, 198, 93

[56] References Cited

U.S. PATENT DOCUMENTS

| | | | |
|---|---|---|---|
| 4,471,799 | 9/1984 | Buck .................................... | 285/325 X |
| 4,533,020 | 8/1985 | Yamazaki ............................. | 285/325 X |
| 4,625,999 | 12/1986 | Valentine ................................ | 285/24 |
| 5,069,362 | 12/1991 | Albright ............................... | 285/325 X |

*Primary Examiner*—Dave W. Arola
*Attorney, Agent, or Firm*—Price Gess & Ubell

[57] ABSTRACT

A coupling mechanism for removably connecting a fluid line to an apparatus such as a mass flow controller and includes a flange member for connection to the apparatus so that it is cantilevered from the apparatus and provides a fluid connection with a bore opening that is vertically aligned. A yoke member is dimensioned to extend over the flange member and have a corresponding fluid conduit and bore that can be aligned vertically with the bore opening on the flange member. A seal member can be positioned between the yoke member and the flange member. A spacer member is mounted in the yoke member and a fastener member can be aligned vertically to exert a force on the flange member to apply a sealing pressure to the seal member while locking the yoke member to the flange member.

16 Claims, 6 Drawing Sheets

COUPLING MECHANISM FOR CONNECTING A FLUID LINE TO A MASS FLOW CONTROLLER OR OTHER DEVICE

BACKGROUND OF THE INVENTION

1. Field of the Invention

The present invention relates to a coupling mechanism for connecting a fluid line, such as a gas or liquid conduit, to an apparatus having limited connection space, such as a mass flow controller or other device, and, more particularly, to a coupling mechanism that can positively connect and seal the fluid line connection by tightening one fastener member.

2. Description of Related Art

Various forms of connecting mechanisms for providing a fluid tight seal for a coupling that can be subsequently removed are known in the prior art. For example, in the semiconductor manufacturing field, an accumulation type gas unit is designed to supply various gases for the manufacturing of a semiconductor product. Each source of gas has its own gas supply route and a mass flow controller (hereinafter referred to as "MFC") is frequently utilized to control the gas flow volume for the manufacturing operation. The MFC has a primary side that receives the in-flowing gas and a secondary side that emits the gas from the controller. Pipes are used to couple with the MFC and a problem is frequently experienced in that each gas component generally requires a connection that is elongated in a sidewise direction to thereby make the area occupied by the gas unit relatively large.

In order to eliminate such a drawback on both the primary side and the secondary side, upper and lower connection flanges have been provided for connecting the MFC with other apparatus and seal members are provided at a central position between the two flanges on both the primary side and the secondary side. Usually, two or four bolts are provided at a peripheral portion of the flanges surrounding the central position. Accordingly, it is necessary to ensure that the bolts are appropriately torqued down so that equal pressure is applied to ensure a uniform seal. A higher level of skill is required in the service personnel in order to prevent any gas leakage of gases that can be toxic. If the flanges are not appropriately torqued to a proper level, then a twisting or a distortion of the sealing member can occur resulting in leakage. As a result, a significant period of time can be required to ensure the proper torquing of the bolts, thereby raising the occasion of maintenance problems and increasing the time for replacement of parts that would be experienced by the customer.

Accordingly, the prior art is still seeking to optimize the connection and decoupling of gas lines to apparatus such as MFCs.

OBJECTS AND SUMMARY OF THE INVENTION

It is an object of the present invention to provide an improved coupling mechanism for connecting apparatus such as MFCs and other devices that operate upon or distribute gases or other fluids to sources of the fluids without requiring a high level of skill, while maintaining reliability of the coupling mechanism and ensuring an ease in maintenance.

The present invention includes a flange member for connection to the apparatus that is to operate upon the fluid being supplied, such as an MFC. A yoke member or lower flange member includes upwardly extending arms that are spaced to receive the flange member between the arms. A spacer member can be fitted within an indented section of the arms. This spacer member has a threaded bore and is adapted to receive a bolt that can be vertically mounted within the spacer member. A sealing member, such as a washer or other sealing structure, can be mounted at the base of the yoke member, for example, within a circular groove surrounding an opening to a fluid conduit, so that it is positioned between the flange member and the yoke member. An appropriate conduit having a bore or aperture is provided for gas flow in the flange member and also in the yoke member with a sealing member operatively positioned between the two. By tightening the bolt member, it can exert a force on the top of the flange member and, more particularly, in a predetermined concave section, thereby centering and drawing the yoke member upward to provide a forced fit for capturing the sealing member and establishing the connection.

As an alternative embodiment, a retainer member can also be provided, with an appropriate indented portion as a modification of the yoke arms, to isolate any direct contact of the bolt with the flange. An alignment pin on an upper surface of the flange can cooperate by mating with an indented alignment hole on the spacer member. The spacer member can also have a concave portion for receiving the force applying end of the bolt. The tightening of the bolt will exert an upward force on the yoke member for providing a sealing contact with the flange member.

In operation, the bolt member can have an appropriate head to receive a rotational force, for example, from a wrench, so that a single fastening member can be used to connect and disconnect the coupling mechanism. The flange member can be connected, for example, to the MFC by a series of bolts that can be horizontally fastened into appropriate threaded holes in the side of the MFC.

Accordingly, the present invention provides a coupling mechanism for removably connecting a fluid line to an apparatus, such as an MFC having a corresponding fluid conduit with a vertically aligned bore positioned on a cantilevered flange structure, extending from a side wall of the MFC.

A yoke or flange member having a central opening of a dimension to extend over the cantilevered flange structure is provided with a corresponding fluid conduit and bore to be aligned vertically with the bore on the cantilevered flange structure.

A spacer member is mounted in the yoke member with a fastening member, such as a bolt, vertically movably mounted in the spacer member.

A seal member is provided between the bore in the yoke or flange member and the bore in the cantilevered flange structure, whereby movement of the fastening member can apply sealing pressure to the seal member while locking the yoke or flange member to the cantilevered flange structure.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art of fluid connection for the semiconductor industry to make and use the invention and sets forth the best modes contemplated by the inventor of carrying out his invention. Various modifications, however, will remain readily apparent to those skilled in the art, since the generic principles of the present invention have been defined herein specifically to provide a coupling mechanism for connecting a fluid line, such as a gas or liquid conduit, to an apparatus having a limited connection space, such as a mass flow controller or other device, and, more particularly, to a coupling mechanism that can positively install and seal the fluid line by the tightening of one fastener member.

Figure 1:
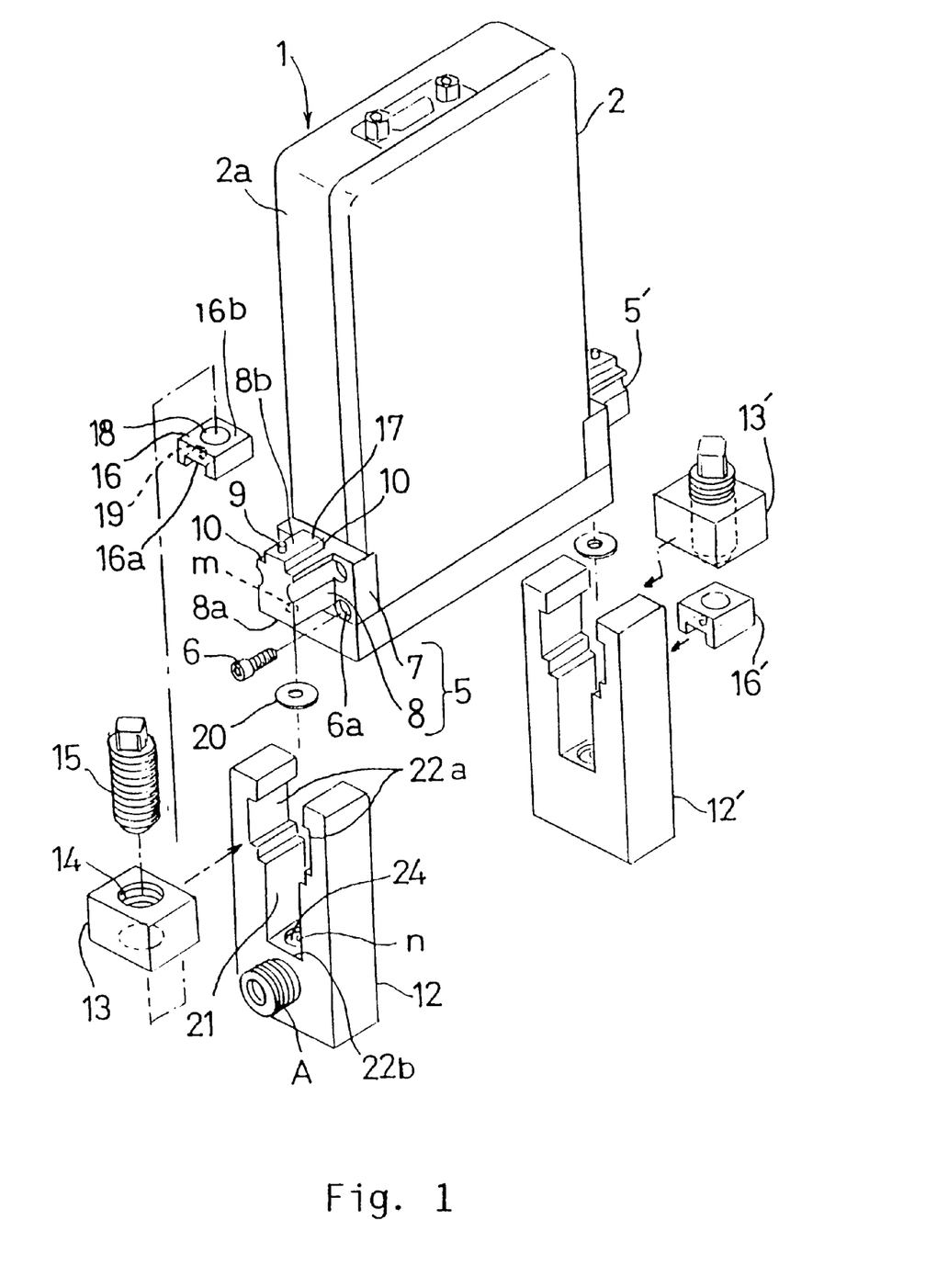
FIG. 1 is an exploded prospective view showing a first embodiment of the present invention.
Figure 2:
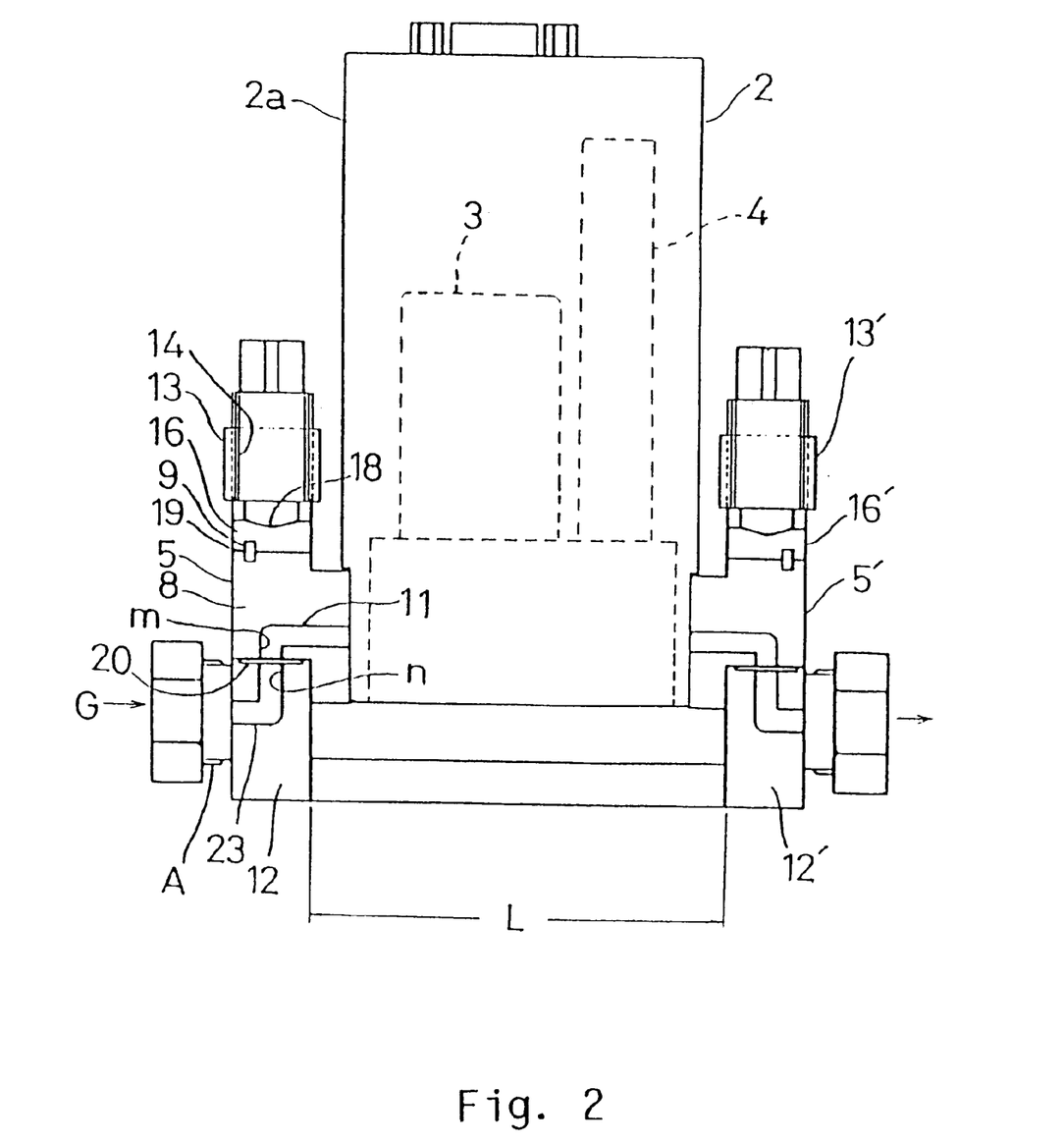
FIG. 2 is a front partial schematic view of the present invention connected to an MFC.

With reference to the above described drawings, a first embodiment of the present invention is shown in FIGS. 1–5. In FIG. 1, element 1 is a mass flow controller (hereinafter referred to as"MFC"), which, as can be seen in FIG. 2, includes a housing or narrow body member 2 having therein a sensor portion 3 for measuring the flow rate of a gas G and a flow rate controller 4 for carrying out the control of the flow rate of the gas G inside the body 2. Since these features are known to a person of ordinary skill in this field and do not constitute a part of the present invention, they will not be further described. As can be appreciated, the width of the MFC is relatively small and banks of MFCs can be grouped together in a production environment. It is desirable to not only ensure a positive coupling to a fluid source, but also to minimize the width of any coupling mechanism.

Figure 5:
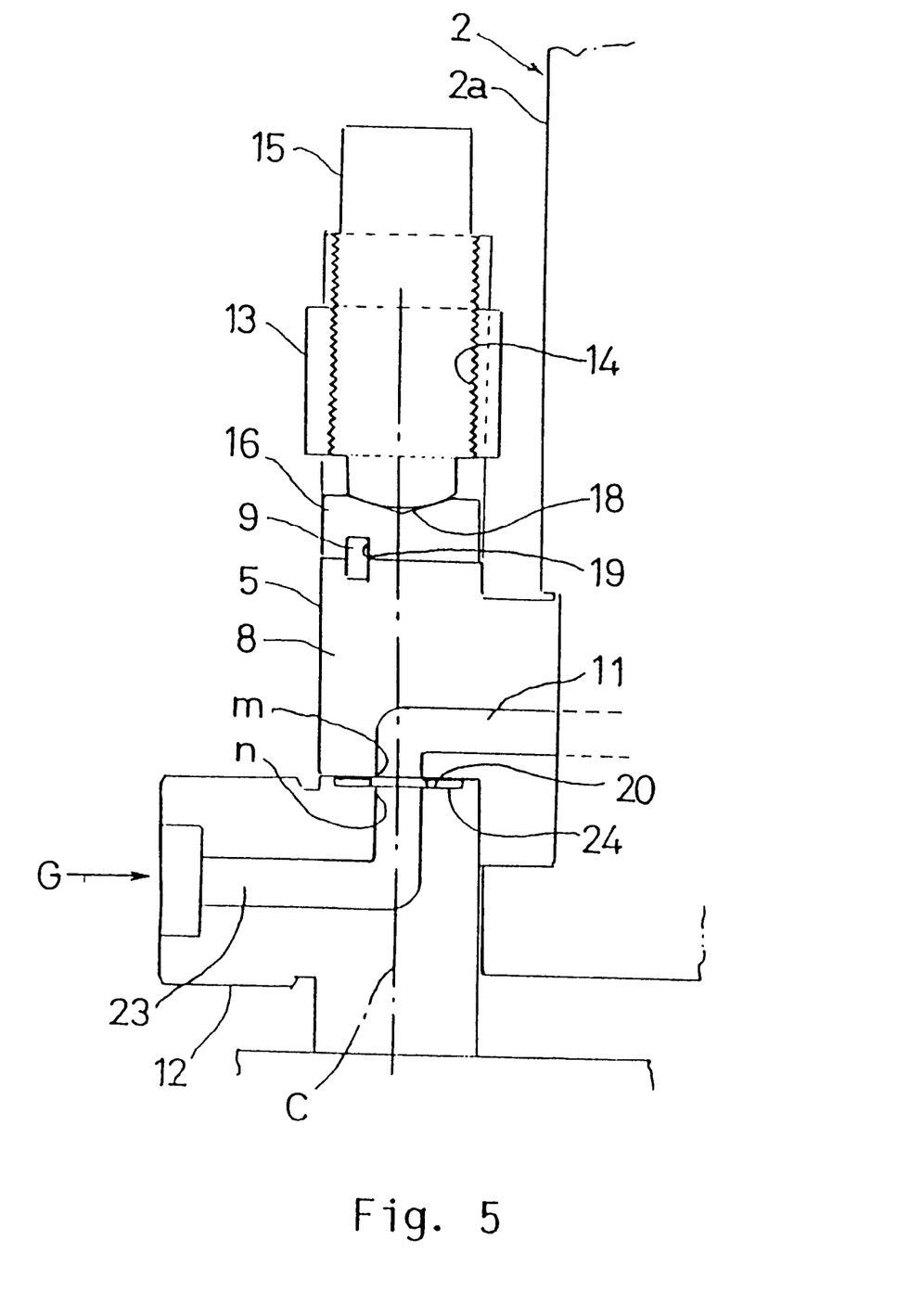
FIG. 5 is a partial cross-sectional side view of the coupling mechanism of the present invention.

Referring to the left side of FIG. 1, the primary side, or gas inlet side of the MFC, is disclosed in an exploded view and includes an upper flange member 5 having a supporting part 7 through which bolt holes 6a are formed to provide a direct connection to the body 2 of the MFC. Extending from the supporting part 7 is a convex part 8 that projects from a central part of the supporting part 7. The supporting part 7 can be fixed to the body member 2 of the MFC by four bolts 6 to the side surface 2a of the body 2 to provide a cantilevered structure appended to a side wall 2a of the MFC. As can be seen, the side surfaces of the convex part 8 can be further indented to accommodate the mounting of the bolts 6. The convex part 8 further includes a conduit 11, or flow route for the gas G, which terminates at an aperture or in-flow hole m located at the bottom of the projecting convex part 8. The lower face 8a of the convex part 8 is formed with a flat surface and at the center of the lower face 8a, the in-flow hole m is provided. The upper face 8b of the convex part 8 can have a locator pin 9. As can be seen in FIG. 5, the locator pin 9 is preferably displaced from a center line C which is coaxial with the in-flow hole m. The upper portion of the convex part 8 can also have a pair of right and left step flanges or ledges 10. In this embodiment, the gas conduit is bent at a 90° angle within the body of the upper flange 5.

The upper flange 5' on the secondary side (the gas outlet side) will also have the same construction parts as the upper flange 5 on the primary side. A lower flange or yoke member 12 has an approximate U-shape and includes a pair of upwardly extending arms forming a concave opening or part 21 therebetween. The lower flange 12 or yoke member has a primary side coupling A which in turn can be coupled to a pneumatic pressure valve (not shown) for connection to other apparatus or to sources of gas or fluids.

The lower flange 12' on the secondary side (gas outlet side) can be mounted on the MFC so as to provide a predetermined space distance L as shown in FIG. 2. In the disclosed embodiment, the respective lower flanges 12 and 12' are separately connected to either side of the body 2. It can be understood that the two lower flanges can be connected through a connector (not shown) having a predetermined length L that may be set up as an alternative embodiment for fitting to a standardized MFC housing.

In the first embodiment, a spacer member 13 of a rectangular configuration can have a bolt hole or bore 14 extending vertically through its center with appropriate threads for matching with a fastening member, such as a threaded bolt 15. The upwardly extending arms of the lower flange or yoke member 12 has a matching configuration to the spacer member 13 with a pair of indents 22a that form right and left guide portions to slidingly receive the spacer member 13. As can be appreciated, the yoke member 12 could be alternatively constructed with a solid upper surface with an appropriate threaded vertical bore hole to serve an equivalent function as the spacer member 13.

A retainer member 16, which has a gate type shape when viewed from its front side, is provided with a lower face portion 16a that is configured to engage with the upper face portion 17 of the convex part 8. As can be seen, the lower surfaces of the side legs and the retainer member 16 can be mounted on the respective right and left step flanges or ledges 10. At a central position on the upper face 16b of the retainer member 16, there is provided a shallow concave depression 18 that is designed to receive and center a force transmitting end surface of the bolt 15. Additionally, as seen in FIGS. 1 and 2, a locator pin 9 on the upper face 8b can be mounted within a locator pin groove or indent 19 that is formed at a corresponding position on the lower face portion 16a of the retainer member 16. Thus, the retainer member 16 can be appropriately located to straddle the upper surface of the convex part 8 and the concave depression 18 can provide a minor centering function for the lower flange 12 assembly.

The same type of spacer member 13' and retainer member 16' is also correspondingly provided on the secondary side of the MFC. A ring sealing member 20 is used to prevent any leakage of the fluid and is provided between the upper flange 5 and the lower flange or yoke member 12. The ring sealing member 20 is shown as a ring washer, but alternative sealing structures that are non-corrosive to the fluid can be used as known in the industry. The concave opening or part 21 on the lower flange or yoke member 12 will receive the spacer member 13 so that it will be on an axial line of its bolt hole or bore 14 and the center line C of the in-flow hole m as shown in FIG. 5.

Figure 3:
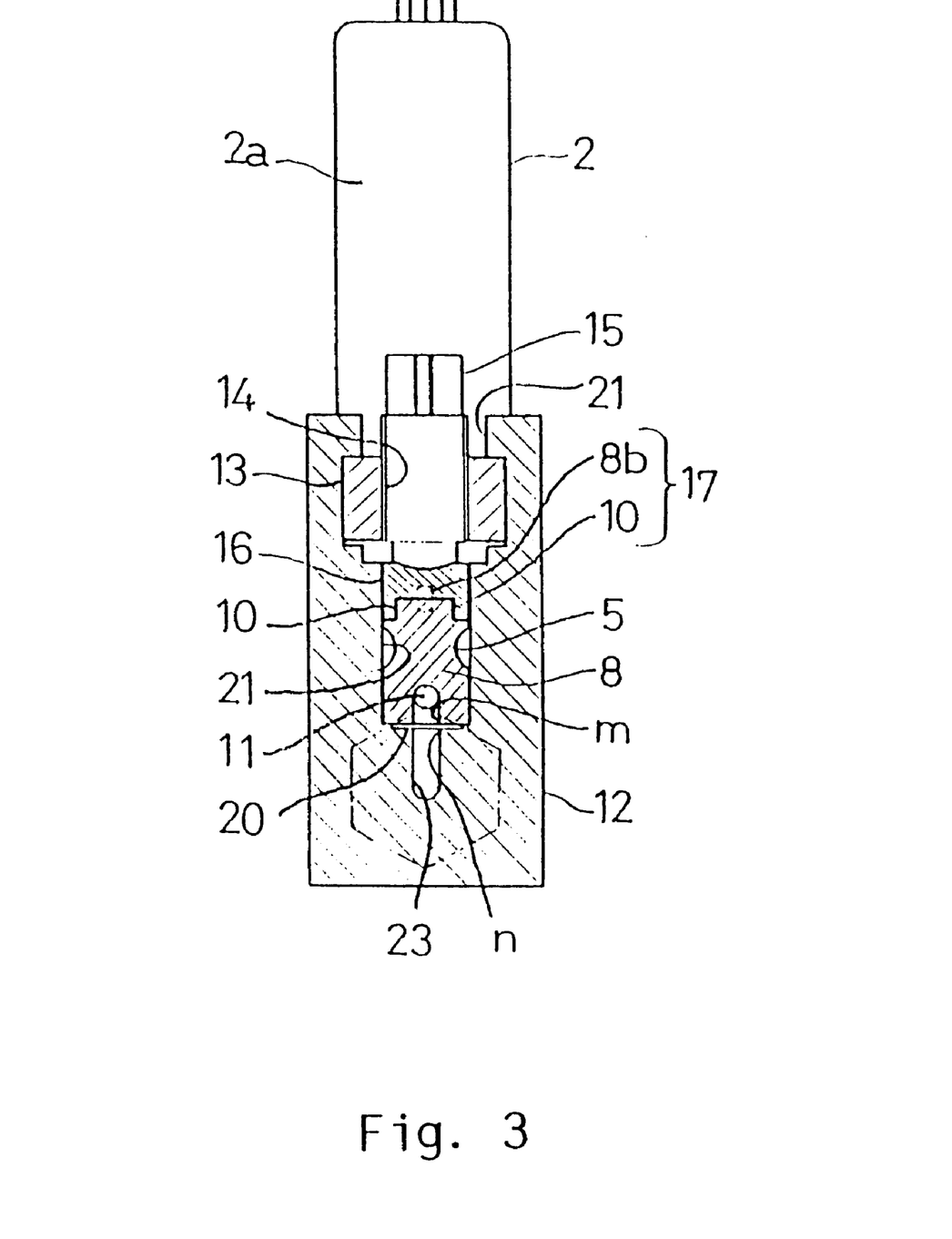
FIG. 3 is a side view with a partial cross-section of components of the present invention.
Figure 4:
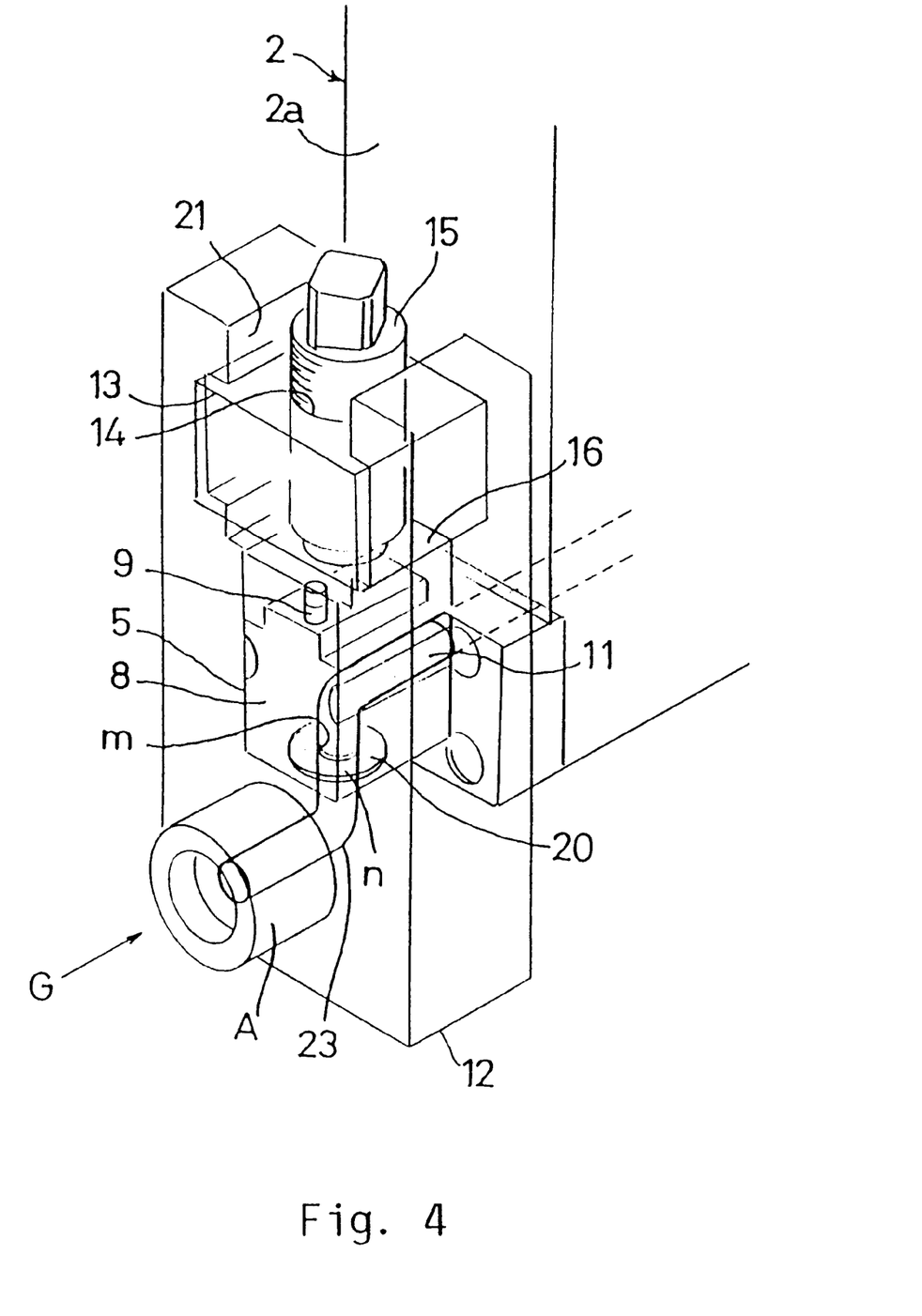
FIG. 4 is a perspective view with phantom views for disclosing the cooperative elements of the present invention.

On the bottom face 22b, the lower flange or yoke member 21 has an outflow port or hole n for communicating with a conduit that connects to the coupling A. The fluid conduit has a bent 90° shape as shown in FIG. 2, but other shapes can be used. The outflow hole n is bored so that it is centrally positioned within a circumferential groove 24 formed on the bottom face 22b in the concave portion 21. The circumferential groove 24 is of a configuration to receive the seat sealing member 20. As seen in FIG. 2, the sealing member 20 is positioned between the fluid conduit 11 and the fluid conduit 23. In addition, the outflow hole n is also positioned on the center line C. The concave shape or rectangular configuration of the lower flange member or yoke member 12 is dimensioned to extend adjacent the vertical side walls of the cantilevered convex member 8 and the retainer member 16 as shown in FIG. 3. When the lower flange member 12 is inserted over the convex member 8 and the retainer member 16, the spacer member 13 can then be inserted to be captured in the indented grooves 22a. This positions the lower flange member 12 with the sealing ring 20 on the center line C. To fix this coupling assembly and to provide an appropriate seal between the gas conduit 11 and the gas conduit 23, the bolt member 15 is appropriately rotated, for example, with a wrench or other instrument, so that a force is exerted on the concave depression 18 on the retainer member 16. This force drives the lower flange member or yoke member 12 upward to both capture and seal the ring seal member 20 in a fluid type arrangement. As can be appreciated from FIG. 3, the lateral dimension of this arrangement is not much wider than the actual width of the MFC. A relatively unskilled worker can appropriately rotate the bolt 15 with only a single fastening member creating a balanced sealing effect and also locking the coupling mechanism in place.

The forces exerted by the bolt member 15 are directed along the center line C and it would be difficult to misalign this structure and its corresponding parts. A similar arrangement is provided for the lower flange 12' on the secondary side.

As can be appreciated, the retainer member 16 is easily fitted onto the upper face portion 17 of the convex part 8 and the pin 9 can ensure an accurate positioning when it fits into the pin groove 19. Subsequently, the lower flange member 12 can be mounted to encompass the convex part 8 and the retainer member 16. The spacer member 13 having an appropriate bolt hole 14 can be mounted above the retaining member 16 so that the bolt hole 14 is positioned in a straight in-line position above the inflow hole m and the outflow hole n. That is, the axial line of the bolt hole 14, the inflow hole m and the outflow hole n are positioned on the center line C.

When the bolt 15 is screwed into the bolt hole 14 in a vertical direction, the bolt 15 will fasten the coupling assembly by pressing the concave portion 18 of the upper face 16b of the retainer member 16. This pressing force of the bolt 15 is transmitted to the convex part 8 through the lower flange member 12, thereby making it possible to prevent any gas leakage from the outflow hole or openings n and the inflow hole or openings m since the sealing member 20 will be uniformly torqued within its circumferential groove 24. As the operative end of the bolt 15 does not directly contact the upper surface 8b of the convex part 8, then damage to the convex part 8 will be avoided and, if necessary, the retainer member 16 can be replaced if it is damaged.

By this particular construction, not only a compact coupling mechanism is provided, but the central portions of both of the flanges 5 and 12 can be fastened with a single bolt 12 that is rotated in a vertical direction so that it is easily accessible to a technician. The fastening procedure and the sealing method are accomplished at the same time and the parts can be conveniently and quickly installed and removed. Thus, maintenance and reliability of the coupling mechanism are assured with low skilled technical people. As can be readily appreciated, the same procedure can be used for the attachment of the lower flange 12' and corresponding parts on the secondary side of the MFC.

Figure 6:
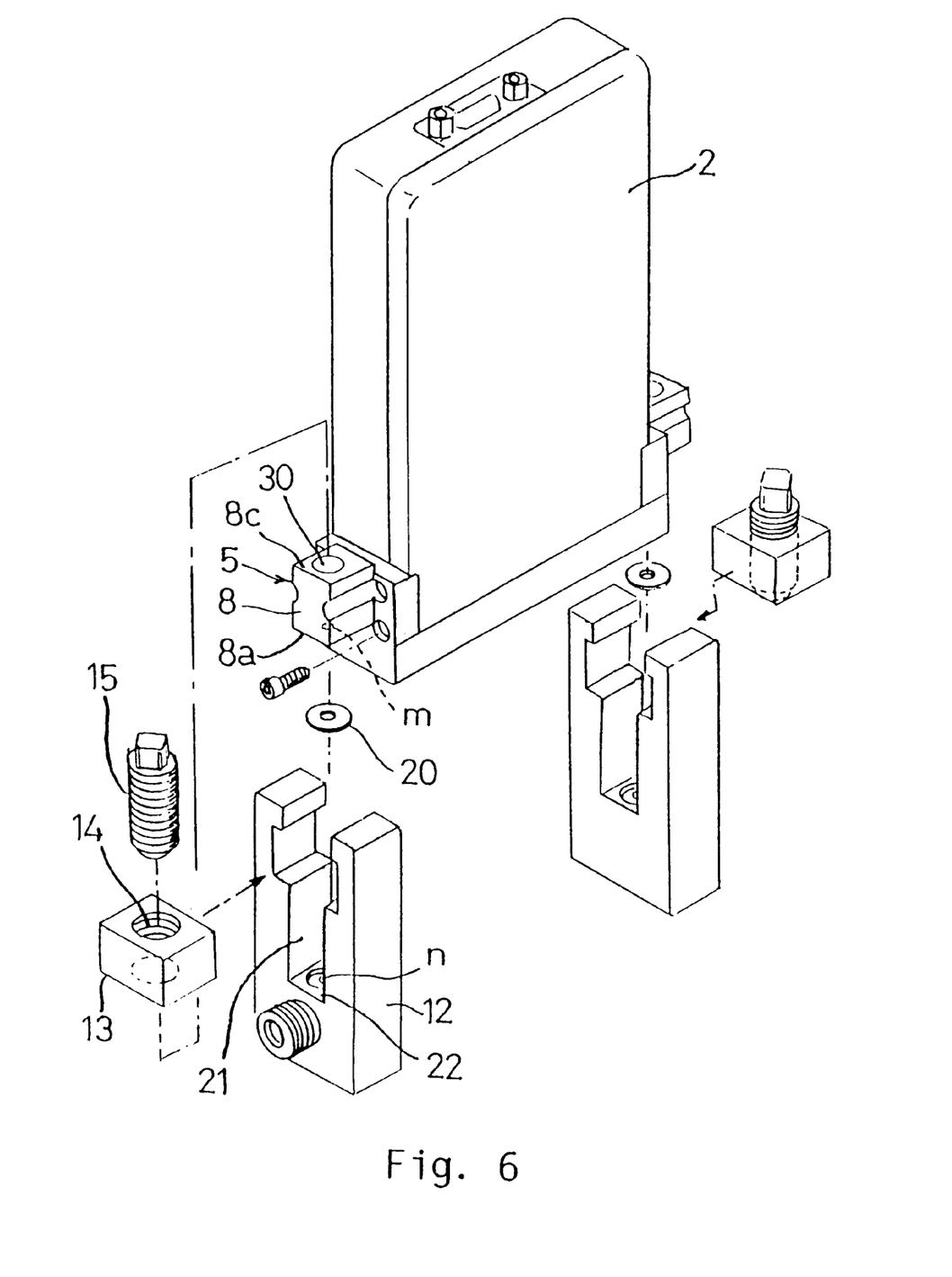
FIG. 6 is an exploded perspective view showing an alternative embodiment of the present invention.

An alternative embodiment of the present invention is shown in FIG. 6 wherein a fewer number of parts can be used to constitute the coupling mechanism of the present invention. In this embodiment, the retainer member 16 described above is rendered unnecessary since the upper surface 8c of the cantilevered convex part 5 can directly receive the force transmitting end of the single bolt member 15. In this embodiment, the same parts that were described with regards to the embodiment in FIGS. 1–5 will carry the same reference numbers.

As seen in FIG. 6, the central position on the upper face 8c of the convex part 5 has a shallow concave part or portion 30 with which the tip of the bolt 15 can come into direct contact at the time of fastening of the coupling member. By fitting the convex part formed at the central portion of the upper flange 5 into the lower position of the concave part 21 between the extending arms of the lower flange member 12, the inflow hole m will be provided at the central part of the lower face 8a of the convex part 8 and the outflow hole n will be provided at the bottom face 22b in the concave part 21. The spacer member 13 can be used to fasten the assembly after the sealing ring member 22 is appropriately positioned within the circumferential groove surrounding the outflow hole n. The bolt hole 14 will be positioned above the inflow hole m and the outflow hole n and by screwing the single bolt 15 into the bolt hole 14 from a vertical or upper direction, the force will be transmitted through the spacer member 13 to the lower flange member or yoke member 12. The lower flange member 21 will be drawn upward to compress the seal member 20, while at the same time fastening the coupling mechanism in place. Accordingly, by simply rotating the single bolt 15 in the bolt hole 14, a force will be exerted along the center line of the bore holes and appropriate torquing of the seal will be accomplished, while at the same time fastening the assembly through the use of only a combination of the spacer member 13 and the lower flange or yoke member 12. Needless to say, the same arrangement can be provided on the secondary side of the MFC.

In describing the various embodiments of the present invention, the example has used an apparatus for controlling or measuring gas, such as a mass flow controller. It should be appreciated, however, that other operative instruments, such as a mass flow meter for measuring the flow rate of the fluid or a pressure controller for controlling the flow rate of the fluid and adjusting its pressure, could be equally an advantageously accommodated by the merits of the present invention.

The present invention achieves a simplicity in creating a coupling mechanism that will be compact and require relatively low skill for both the coupling and decoupling of the coupling mechanism.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A coupling mechanism for removably connecting a fluid line to an apparatus having a corresponding fluid conduit with an opening positioned in a cantilevered structure, the opening being vertically aligned with a center line, comprising:

a yoke member having a central opening of a dimension to extend over the cantilevered structure, the yoke member having a corresponding fluid conduit and an opening to be aligned vertically along the centerline with the opening in the cantilevered structure;

a spacer member mounted in the yoke member with a fastening member movably mounted in the spacer member; and a seal member provided between the opening in the yoke member and the opening in the cantilevered structure, and movement of the fastening member applies sealing pressure to the seal member while locking the yoke member to the cantilevered structure.

2. The invention of claim 1 wherein the yoke member has a U-shape configuration.

3. The invention of claim 1 wherein the yoke member has indented grooves which extend about portions of the spacer member for supporting the spacer member.

4. The invention of claim 1 wherein the yoke member includes a side coupling that communicates with its fluid conduit.

5. The invention of claim 1 wherein the spacer member has a rectangular box-like configuration.

6. The invention of claim 1 further including a retainer member mounted on the cantilevered structure and beneath the spacer member to contact the fastening member and movement of the fastening member exerts a force against the retainer member that forces the spacer member to move the yoke member to apply the sealing pressure.

7. The invention of claim 6 wherein the retainer member has a concave depression to receive an operative end of the fastener member for applying the force.

8. The invention of claim 1 wherein the spacer member has a vertically threaded bore and the fastener member is a threaded bolt.

9. The invention of claim 1 wherein the yoke member bore has a circumferential groove of a configuration to receive and seat the seal member.

10. The invention of claim 1 wherein the seal member has a ring shape.

11. A coupling mechanism for removably connecting a fluid line to an apparatus having a corresponding fluid conduit with an opening positioned in a cantilevered structure, the opening being vertically aligned with a center line, comprising:

a yoke member having a central opening of a dimension to extend over the cantilevered structure, the yoke member having a base portion with a corresponding fluid conduit and an opening to be aligned vertically with the opening in the cantilevered structure;

a retainer member mounted on the cantilevered structure with a concave depression;

a fastener member having an end that is aligned by the concave depression of the retainer member;

a spacer member mounted in the yoke member with the fastening member movably mounted in the spacer member; and a seal member provided between the opening in the yoke member and the opening in the cantilevered structure, and movement of the fastening member applies sealing pressure to the seal member by contacting the concave depression of the retainer member and fastening the yoke member to the cantilevered structure.

12. The invention of claim 11 wherein the cantilevered structure includes a first indexing member and the retainer member has a second indexing member to ensure alignment of the retainer member on the cantilevered structure.

13. A coupling mechanism for removably connecting a fluid line to an apparatus having a fluid conduit with a bore comprising:

flange member for a cantilevered connection to an apparatus, the flange member having a corresponding fluid conduit that is connected to the bore of the apparatus, the flange member having a bore opening that is vertically aligned with a center line;

a yoke member having a central opening of a dimension to extend over the flange member, the yoke member having a corresponding fluid conduit and a bore opening to be aligned vertically along the center line with the bore opening on the flange member;

a fastener member;

a spacer member mounted in the yoke member with the fastening member movably mounted in the spacer member to move the yoke member relative to the flange member; and a seal member provided between the bore opening in the yoke member and the bore opening in the flange member, and movement of the fastening member applies sealing pressure to the seal member while locking the yoke member to the flange member.

14. A coupling mechanism for removably connecting a fluid line to an apparatus with a hand tool, comprising:

a flange member having means for connection to an apparatus to provide an extended fluid connection external to the apparatus with a fluid connection opening positioned along a vertical centerline;

a yoke member having an opening with the flange member positioned therein, the yoke member having an internal fluid conduit with a fluid conduit opening positioned along the vertical center line opposite the flange member fluid connection opening;

a spacer member positioned within the opening of the yoke member above the flange member and contacting the yoke member to transmit a force;

a fastener member connected to the spacer member and configured to be moved by the hand tool to apply a force to be transmitted to the spacer member; and a seal member provided between the fluid conduit opening in the yoke member and the fluid connection opening in the flange member, and movement of the fastener member causes the yoke member to sealingly position the seal member between the fluid conduit opening in the yoke member and the fluid connection opening in the flange member.

15. The coupling mechanism as in claim 14, wherein the fastener member is in contact with the flange member to force the spacer member away from the flange member when applying sealing pressure.

16. The coupling mechanism as in claim 15, wherein the flange member has a recess in its surface to seat an end of the flange member.

* * * * *